April 6, 1937.  A. RYDQUIST  2,076,417
MOUNTING FOR GRIP CORDS
Filed July 3, 1935    2 Sheets-Sheet 1
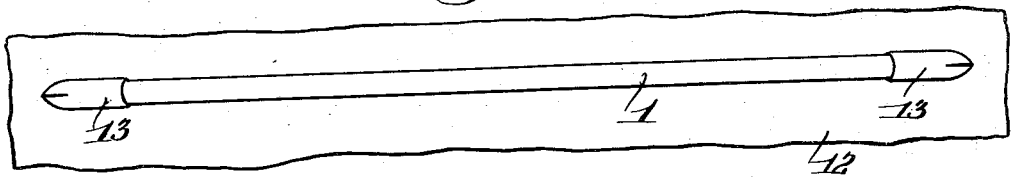
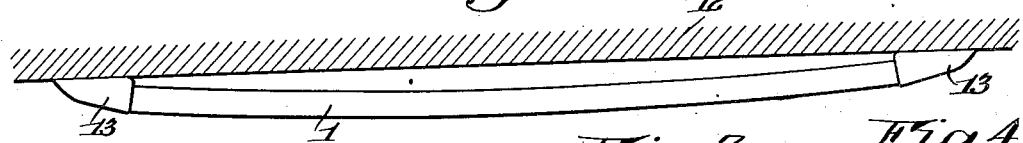
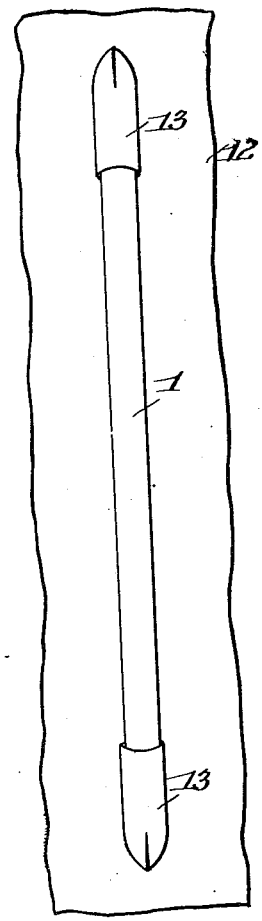
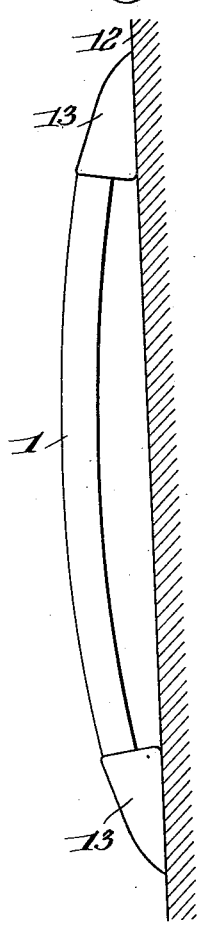
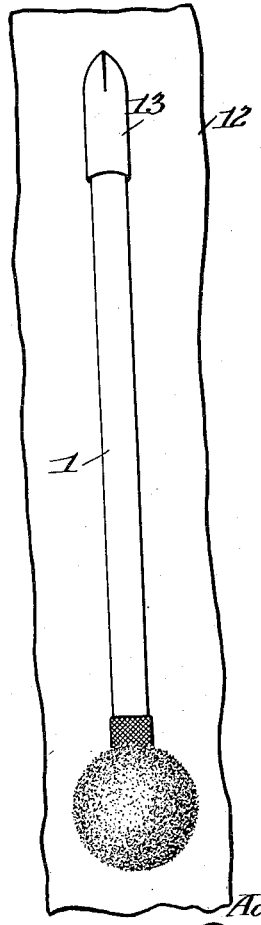
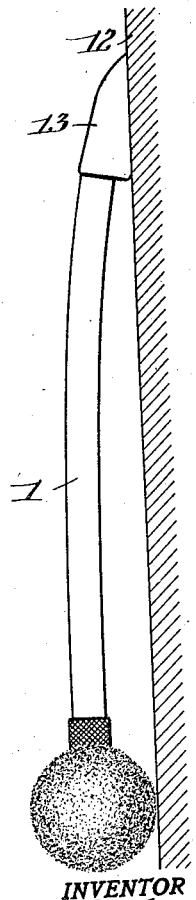
INVENTOR
Adolph Rydquist
BY Edward H Cumpston
his ATTORNEY April 6, 1937.  A. RYDQUIST  2,076,417
MOUNTING FOR GRIP CORDS
Filed July 3, 1935  2 Sheets-Sheet 2
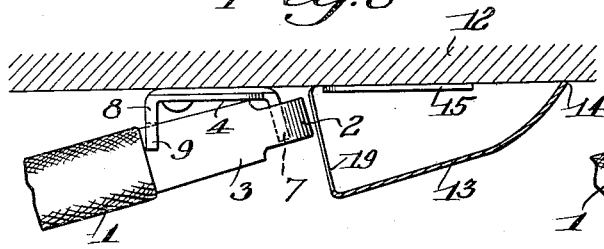
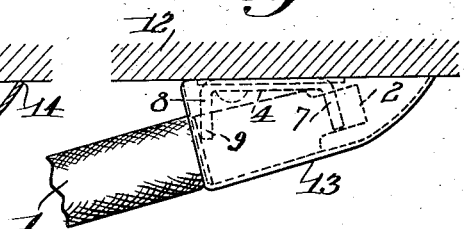
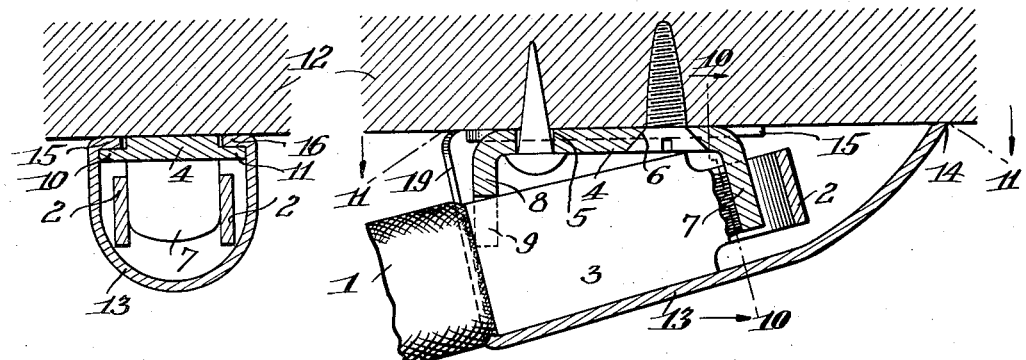
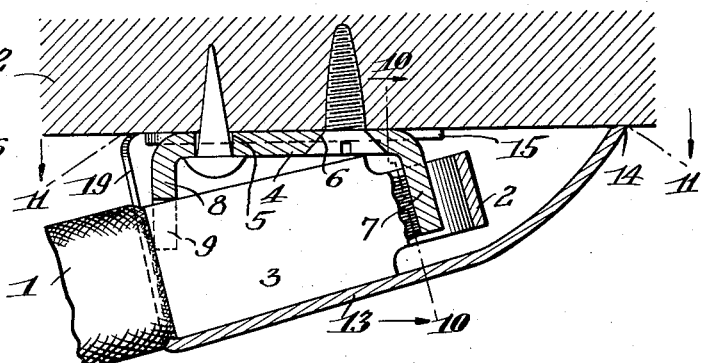
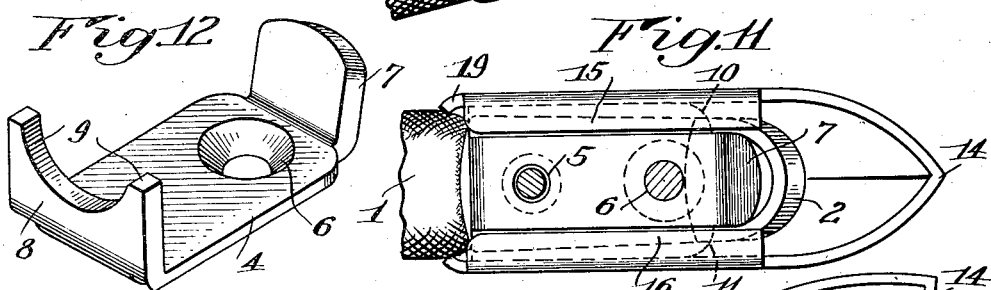
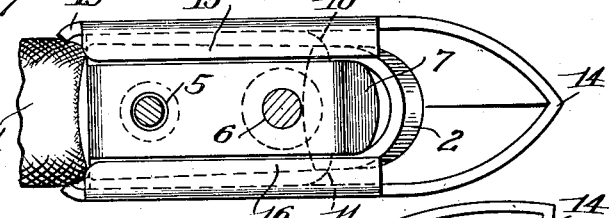
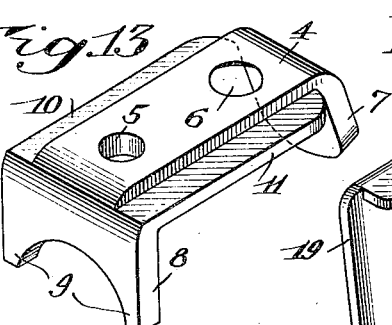
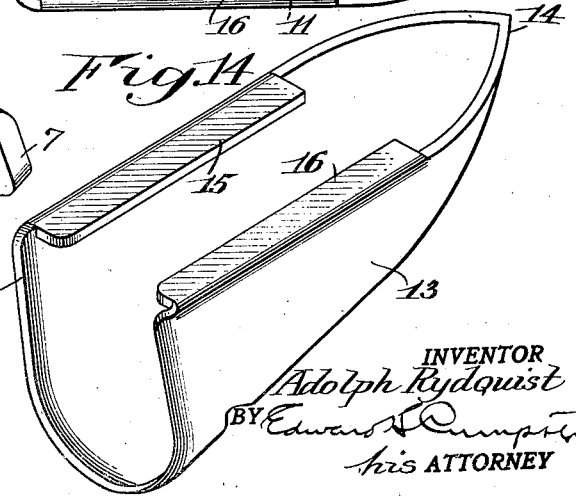
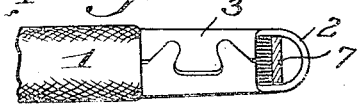
INVENTOR
Adolph Rydquist
BY Edward ......
his ATTORNEY Patented Apr. 6, 1937

REISSUED
JAN 16 1940

2,076,417

UNITED STATES PATENT OFFICE 2,076,417

MOUNTING FOR GRIP CORDS

Adolph Rydquist, Rochester, N. Y., assignor to The Schlegel Manufacturing Company, Rochester, N. Y., a corporation of New York Application July 3, 1935, Serial No. 29,746

17 Claims. (Cl. 105—354)

This invention relates to mountings for grip cords, of the kind used in vehicles, or similar places, and has for its principal object, the provision of a mounting for grip cords, straps, cables, or the like, which is simple in construction, attractive in appearance, economical to make and which is not liable to become dislocated when in use.

More specifically the object of the invention is the provision of a mounting for a grip cord comprising a base plate adapted to be secured to a support and to which the grip cord may be detachably connected. A shield or housing for the end of the grip cord is also detachably mounted on said base plate and serves to secure the grip cord thereto.

To these and other ends the invention resides in certain improvements and combinations of parts, all as will be hereinafter more fully described, the novel features being pointed out in the claims at the end of the specification.

In the drawings:

Figs. 1 and 2 are front and side elevations respectively, of a grip cord illustrating one possible application of the invention;

Figs. 3 and 4 are front and side elevations, respectively, of a suspended grip cord illustrating another application of the invention;

Figs. 5 and 6 are a front elevation and plan view, respectively, of a robe rail or clothes hanger illustrating still another application of the invention;

Fig. 7 is a side view of the mounting somewhat enlarged, the cord being broken away to conserve space;

Fig. 8 is a similar view showing the housing detached and sectioned away to expose its interior;

Fig. 9 is an enlarged longitudinal sectional view of the cord mount;

Fig. 10 is a transverse section thereof taken substantially on line 10—10 of Fig. 9 and looking in the direction of the arrows at said line;

Fig. 11 is an inverted plan view of the mount, the securing means being sectioned away substantially on line 11—11 of Fig. 9;

Fig. 12 is a perspective view of the upper face of the base plate;

Fig. 13 is a perspective view of the lower face of the base plate;

Fig. 14 is a perspective view of the shield or casing, and

Fig. 15 is a plan view of one end of a grip cord.

Referring particularly to the drawings in which like reference numerals refer to the same part throughout the several views, 1 is a cord or strap of any usual or preferred construction, several forms being illustrated in the drawings. For purposes of illustration, the one shown in the drawings is similar to that disclosed in my pending application for patent for grip cord and method of making same, Serial No. 3,603, filed January 26, 1935. One or both ends of the cord may be provided with an eyelet or loop 2 as shown in Fig. 15, whereby it may be secured or attached to a suitable support or mount. In the form illustrated, the eyelet 2 is formed integral with a ferrule 3, in which the end of the cord is secured.

To secure the end of the grip cord to a support, a member or base plate, generally referred to by the reference numeral 4 and illustrated in detail in Figs. 12 and 13, is provided with one or more openings 5 and 6, whereby it may be secured to a convenient support by means of screws or nails or other preferred means. In the illustrated embodiment, the opening 6 is arranged to receive a flat headed wood screw of usual form and the opening 5, a nail to secure the plate from turning on the screw as a pivot. The base plate 4 is substantially rectangular in form and at one end is provided with a lug or flange 7 with which the eyelet 2 at the end of the cord is adapted to engage. The lug 7 inclines upwardly and outwardly from the upper face of the base plate, so that a pull on the cord tends to move the end portion of the loop of the ferrule toward the base plate. A second flange 8 projects upwardly from the opposite end of the base plate which is recessed to receive the ferrule, the arms 9 of the flange extending on opposite sides of the ferrule and serving to hold it against lateral displacement in opposite directions. The ferrule is anchored against pivotal movement on the base plate through engagement of the lug 7 with the side walls of the loop 2 of the ferrule as shown in Fig. 10.

On its lower face, the side edges of the base plate are cut away to form a pair of substantially parallel recesses or guideways 10 and 11 between the sidge edges of the base plate and the support 12 on which it is mounted. Mounted on said base plate and resiliently engaging said guideways is a retaining member or shield 13 which also serves as a housing for the end of the cord to conceal the ferrule and eyelet thereon. The retaining member 13 is substantially of the form shown in Fig. 14 of the drawings and is constructed of resilient sheet material, such as brass. It has a curved or rounded upper surface terminating in a point 14 at one end, the side walls curving outwardly and rearwardly from said point for a short distance and then continue rearwardly in substantially parallel relation. The parallel portions of the side walls are provided with inwardly projecting flanges 15 and 16 which are adapted to engage the guideways 10 and 11 of the base plate. The end of the retaining member opposite the point 14 is open to provide a clearance for the cord. In order to insure a frictional engagement between the retaining member and the base plate, the distance between the side walls of the retaining member may be slightly less than the width of the base plate, so that the side edges of the base plate are resiliently engaged between the side walls of the retaining member, whereby the retaining member is frictionally secured thereon.

To secure the end of the cord to the support 12, the base plate 4 is first secured thereto. The eyelet 2 on the end of the cord is then engaged with the lug 7 and the cord arranged between the arms 9 on the flange 8. The shield is then seated on the base plate by a sliding movement with its flanges 15 and 16 engaged with the guideways 10 and 11. The material of the retaining member, at its inner end, substantially surrounds the opening therein and is preferably bent, as shown in the drawings to form an inwardly directed flange 19 adapted to resiliently engage the periphery of the cord adjacent the point where the latter engages the flange 8 on the base. The inter-engaging members 7 and 2 are preferably of a size and shape to cooperate in a manner to prevent turning of the ferrule about the axis of the cord. The shield closely overlies the ferrule and serves to retain it in position upon the base plate.

A mount for a grip cord thus constructed, is neat in appearance, since all securing parts are concealed. It is simple and inexpensive to make and may be mounted without the employment of skilled workmen. After the base plate is mounted in position the cord may be attached thereto without the use of special tools and when the cord becomes soiled or worn it may be readily replaced with a clean or new one without the use of tools or detachment of the base plate on which the cord is anchored.

Although I have shown and described herein only one possible embodiment of the invention, it will be understood that this application is intended to cover all such changes or modifications as come within the spirit of the invention or the scope of the following claims.

I claim:

1. A mount for a cord having a recessed ferrule thereon, said mount comprising a base plate having spaced upstanding parts one for detachably engaging the ferrule within said recess and another forming a seat for the cord, a retainer cooperating with the base plate for securing the cord thereon, and means for detachably mounting said retainer on the base plate.

2. A mount for a cord having securing means thereon, said mount comprising a base plate having an opening for the insertion of means for connecting the plate with a support, means on said base plate for attaching said securing means thereto, a recessed seat on the base plate for the cord, and retaining means for detachably securing the cord in said seat against lateral movement in one direction on the base plate, said retaining means being detachable independently of the means for connecting the base plate with the support.

3. A mount for a cord comprising a base plate, means at one end of said plate for attaching a cord thereto, a seat for the cord at the opposite end of said plate, said seat being formed to engage the cord and anchor it against lateral movement in opposite directions on the plate, and detachable means on the base plate for holding the cord against outward displacement thereon.

4. A mount for a cord comprising a base plate, a lug at one end of said plate projecting upwardly therefrom and adapted to have a cord attached thereto, a seat for the cord at the opposite end of said plate, and means for retaining the cord in its seat and atached to said lug.

5. A mount for a cord comprising a base plate, means on said base plate for attaching a cord thereto, a seat for the cord projecting from the base plate, a retainer detachably mounted on said base plate for retaining the cord attached thereto, and means on the retainer for engaging the cord at points opposite and adjacent said seat for retaining the cord rigidly therein.

6. A mount for a cord comprising a base plate, means on said base plate for attaching a cord thereto, a pair of guideways on said base plate, and a retainer detachably mounted in said guideways for retaining the cord on said base plate.

7. A mount for a cord comprising a base plate, a seat on said base for a cord, a pair of guideways on said base plate, a retainer mounted in said guideways and frictionally retained therein, and means on said retainer for resiliently engaging the cord with said seat.

8. A mount for a cord comprising a base plate, means on said base plate for attaching a cord thereto, guideways on said base plate, a retainer, and flanges on said retainer slidably engaging said guideways and resiliently retained thereon.

9. A mount for a cord comprising a base plate, means on said base plate for attaching a cord thereto, a seat for the cord projecting from the base plate, guideways on said base plate, and a retaining member detachably mounted in said guideways.

10. A mounting for a cord comprising a member for attachment to a support in association with a portion of said cord, parts for securing said member to the support, a housing for said member and cord portion, and cooperating parts on said member and housing for detachably securing said housing to said member over said cord portion independently of the securing parts of said member.

11. A mounting for a cord comprising a base member for attachment to a support in association with a portion of said cord, a housing member for said base member and cord portion, and recess means on one of said members and projecting means on the other of said members for securing said housing member to said base member over said cord portion.

12. A mount for a cord having securing means thereon, said mount comprising a base plate having an opening for the insertion of means for connecting the plate with a support, means on said base plate for attaching said securing means thereto, a recessed seat on the base plate for the cord, and retaining means for detachably securing the cord in said seat against lateral movement in one direction on the base plate, said retaining means being detachable independently of the means for connecting the base plate with the support.

13. A mount for an elongated hand grip having a recess formed in one end thereof, said mount comprising a base plate having a body portion adapted for attachment to a support, said body portion having upstanding spaced parts one for engaging the hand grip within the recess thereof to connect the hand grip with the base plate, and another of said parts forming a seat for engaging the hand grip between its ends to form a support for the hand grip, and means detachably connected with the base plate for securing the hand grip thereon.

14. A mount for an elongated hand grip having a recess formed in one end thereof, said mount comprising a base plate having a body portion adapted for attachment to a support, said body portion having upstanding spaced parts one for engaging the hand grip within the recess thereof to connect the hand grip with the base plate and another of said parts being adapted to engage the hand grip between its ends and to support the recessed end of the hand grip in oblique relation to the body portion of the base plate.

15. A mount for an elongated hand grip having a recess formed in one end thereof, said mount comprising a base plate having a body portion adapted for attachment to a support, said body portion having upstanding spaced parts, one for engaging the hand grip within the recess thereof to connect the hand grip with the base plate and another of said parts forming a seat for engaging and supporting the hand grip between the ends thereof, said base plate having oppositely disposed parts forming means for guiding and securing a member insertable on the base plate for retaining the hand grip thereon.

16. A mount for a cord comprising a recessed ferrule for receiving and supporting the cord, a base plate for attachment to a support having a body portion provided with spaced upstanding parts one engaging the ferrule within said recess and another forming a seat for the ferrule, and a device detachably connected with the base plate and serving to secure the ferrule upon the base plate, said ferrule being detachably connected with the base plate and released for removal therefrom upon removing said device from the base plate.

17. A mount for a cord comprising a ferrule for receiving and supporting the cord, a base plate for attachment to a support, said base plate having a body portion provided with spaced upstanding parts one engaging the ferrule and connecting it with the base plate, and another forming a seat for the ferrule, and a device forming a housing for the base plate and the ferrule and detachably connected with the base plate and serving to retain the ferrule upon the base plate.

ADOLPH RYDQUIST.